US006678776B2

(12) United States Patent
McTague

(10) Patent No.: US 6,678,776 B2
(45) **Date of Patent: *Jan. 13, 2004**

(54) SYSTEM FOR A CARD PROXY LINK ARCHITECTURE

(75) Inventor: Michael J. McTague, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/402,012

(22) Filed: Mar. 28, 2003

(65) Prior Publication Data

US 2003/0188068 A1 Oct. 2, 2003

Related U.S. Application Data

(63) Continuation of application No. 09/439,046, filed on Nov. 12, 1999, now Pat. No. 6,549,967.

(51) Int. Cl.[7] ........ G06F 13/00
(52) U.S. Cl. ........ 710/301
(58) Field of Search ........ 710/301, 302, 710/305, 306, 313

(56) References Cited

U.S. PATENT DOCUMENTS 5,805,839 A * 9/1998 Singhal ........ 710/112
5,967,796 A * 10/1999 Hartfiel et al. ........ 361/785
6,134,613 A * 10/2000 Stephenson et al. ........ 710/313
6,189,058 B1 * 2/2001 Jones et al. ........ 710/302
6,549,967 B1 * 4/2003 McTague ........ 710/302

* cited by examiner

*Primary Examiner*—Glenn A. Auve
(74) *Attorney, Agent, or Firm*—Schwegman, Lundberg, Woessner & Kluth, P.A.

(57) ABSTRACT

A PCI bus system for a computer provides a main board with one or more PCI slots mounted on the board, and with each PCI slot adapted to receive a PHI card. Each PCI slot includes a plurality of electrical contacts. A multiplexor is provided for each PCI slot, and each multiplexor has at least first and second sets of electrical inputs selectively connectable to a set of outputs connected to a first set of the electrical contacts on its respective PCI slot. A link controller is provided for each PCI slot, with each link controller mounted on the main board. A first plurality of electrical lines for each PCI slot connect the respective link controller to the first set of electrical inputs on the respective multiplexor. A PCI controller is mounted on the main board, with a second plurality of electrical lines connecting the PHI controller to the second set of electrical inputs on the multiplexor. Also provided are a third plurality of electrical lines connecting the PCI controller to each of a second set of electrical contacts on each PCI slot, wherein the contacts of the second set are different from the first set.

25 Claims, 5 Drawing Sheets

SYSTEM FOR A CARD PROXY LINK ARCHITECTURE

CROSS REFERENCE TO RELATED APPLICATIONS

This application is a continuation of U.S. patent application Ser. No. 09/439,046, filed on Nov. 12, 1999, now U.S. Pat. No. 6,549,967, which is herein incorporated by reference.

TECHNICAL FIELD OF THE INVENTION

The present invention pertains generally to computers, and more particularly to a system for adding functionality to a computer system in a modular fashion.

BACKGROUND OF THE INVENTION

Referring now to FIG. 1, there is shown a prior art computer system 10 with a PCI bus 18 and PCI card 22. As used herein, the term "PHI" shall refer to the standard specified in the PCI Local Bus Specification, Revision 2.2, 1998, and all past or future superceded or superseding standards or other standards equivalent thereto or backward or forward compatible in whole or in part therewith. Further, terms such as "PCI bus", "PCI card" and "PCI slot" shall mean cards, busses or slots compatible or compliant with a PCI standard. A main board 12 includes a main board chip set 14 mounted thereon. Chip set 14 includes a PCI controller 16, which is connected to a PCI slot 20 over PCI bus 18. PCI card 22 includes a PHI card controller 24, which in turn includes a link controller circuit 26, which connects to link interface 30 through proxy link 28. Link interface 30 interfaces to CODEC or network PHY circuit 32, which in turn provides an I/O connection 34. A CPU or processor mounted on the main board communicates with and controls chip set 14.

The above described PCI bus 18 is used to attach various I/O functions to the computer main board 12 in a modular fashion. Typically, computer systems are provided with one or more PCI card slots 20 to provide equipment manufacturers and end users the ability to add custom features to the system. The present invention, as described below, provides an improvement to the above described prior art system and its PCI bus.

SUMMARY OF THE INVENTION

The present invention provides method and apparatus for providing PCI board functionality wherein, in one example embodiment, the control logic for a PCI card is mounted on the main board of a computer system having a PCI bus and PCI slots to receive PCI cards. The PCI card functionality is controlled from the PCI control logic on the main board using a proxy link to the PCI card functionality, wherein the proxy link is routed over the PCI bus. Further, such embodiment provides that a standard PCI card, with the control logic mounted thereon, may also function normally when inserted in one of the PCI slots in the system. This and many other embodiments are described in more detail below.

DETAILED DESCRIPTION OF THE INVENTION

Figure 1:
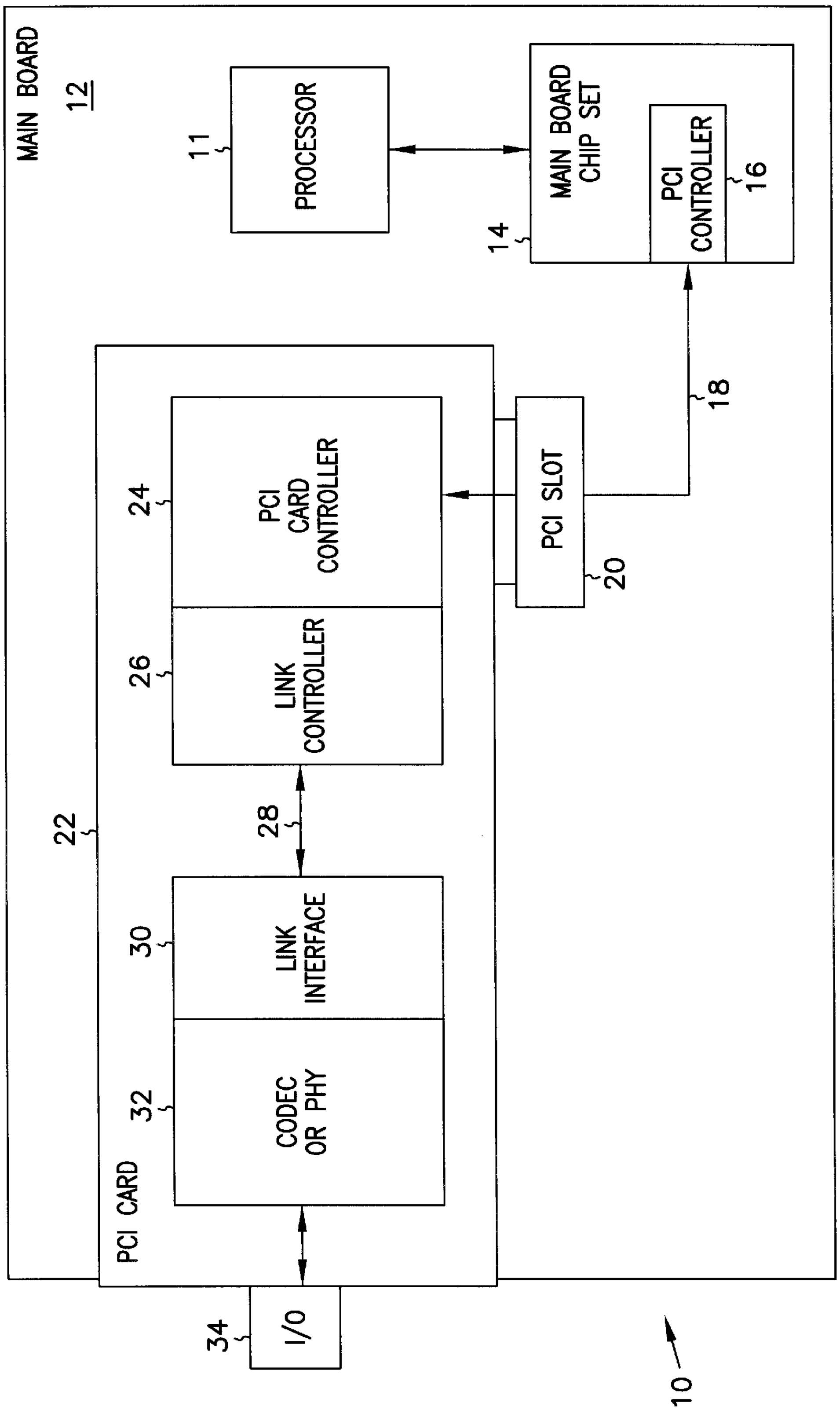
FIG. 1 illustrates a prior art PCI bus system.

In the following detailed description of the invention reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

Figure 2:
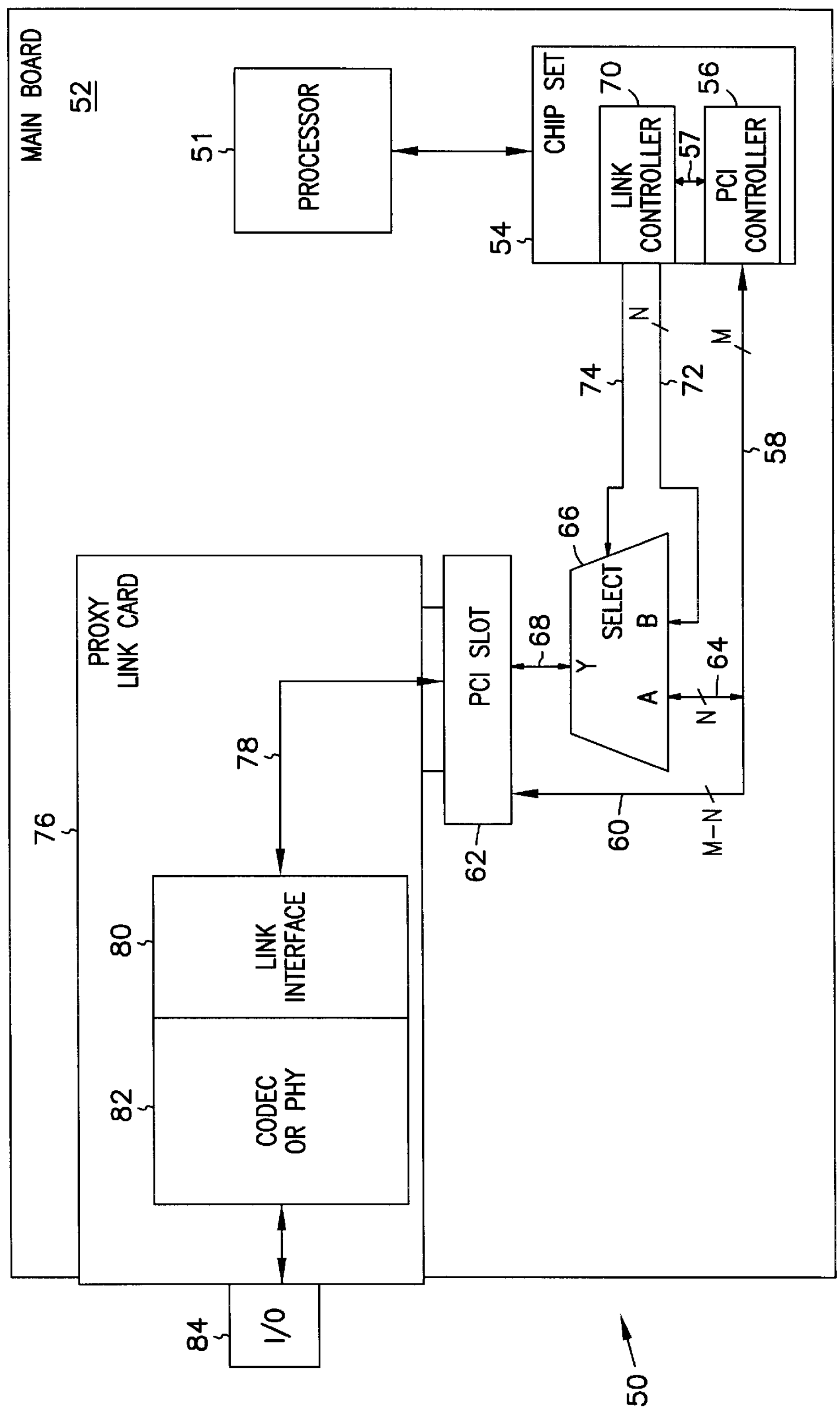
FIG. 2 illustrates a first embodiment of the PCI proxy link method and apparatus of the present invention.

Referring now to FIG. 2, there is shown a first embodiment of the invention. A computer system 50 includes a main board 52, a main board chip set 54, and a PCI proxy link card 76. Chip set 54 includes a PCI controller 56, which in turn is connected to a PCI bus 58 having M lines in total. Bus 58 includes a first set of N lines 64 which are applied to multiplexor 66, and a second set of M-N lines 60 which are applied to a first set of corresponding contacts in PCI slot 62. In one mode, multiplexor 66 switches lines 64 through to lines 68, which are connected to a second set of corresponding contacts in PCI slot 62. Together, the first and second sets of contacts provide a full set of PCI bus contacts.

A link controller 70 is also provided in chip set 54, and is connected to a proxy link having N lines 72, which in turn is connected to a second input of multiplexor 66. In another mode of operation, multiplexor 66 connects lines 72 to lines 68. A mux control signal 74 originating from link controller 70 controls the mode of operation of multiplexor 66. Accordingly, multiplexor 66 selectively connects either lines 64 or lines 72 through to lines 68 and in turn the corresponding contacts of PCI slot 62. A connection 57 exists between the link controller 70 and PCI controller 56 to support proxy link card 76 detection. Also, a CPU or processor 51 is mounted on the board 52 and communicates with and controls chip set 54.

Accordingly, in one mode of operation, when the "A" input of multiplexor 66 is selected, the contacts on PCI slot 62 are connected to the M lines of the PCI controller 56, M-N of these on lines 60, and N of these from lines 64. In this manner, a standard PCI card, with a PCI card controller 24 disposed thereon, may be inserted in the PCI slot 62 and operated as for example illustrated in FIG. 1. In the example of FIG. 2, however, a proxy link PCI card 76 is simplified and does not require a PCI card controller 24, which instead is disposed on the main board 52 as link controller 70. When card 76 is installed in slot 62, the "B" input of multiplexor 66 is selected, and the lines 72 from the link controller 70 are passed through multiplexor 66 and lines 68 to the corresponding contacts of slot 62. Lines 68 are in turn connected to the corresponding lines of link 78, and in turn to the link interface 80. Interface 80 in turn supplies control signals to CODEC or network PHY 82, which in turn provides an I/O connection 84.

Figure 3:
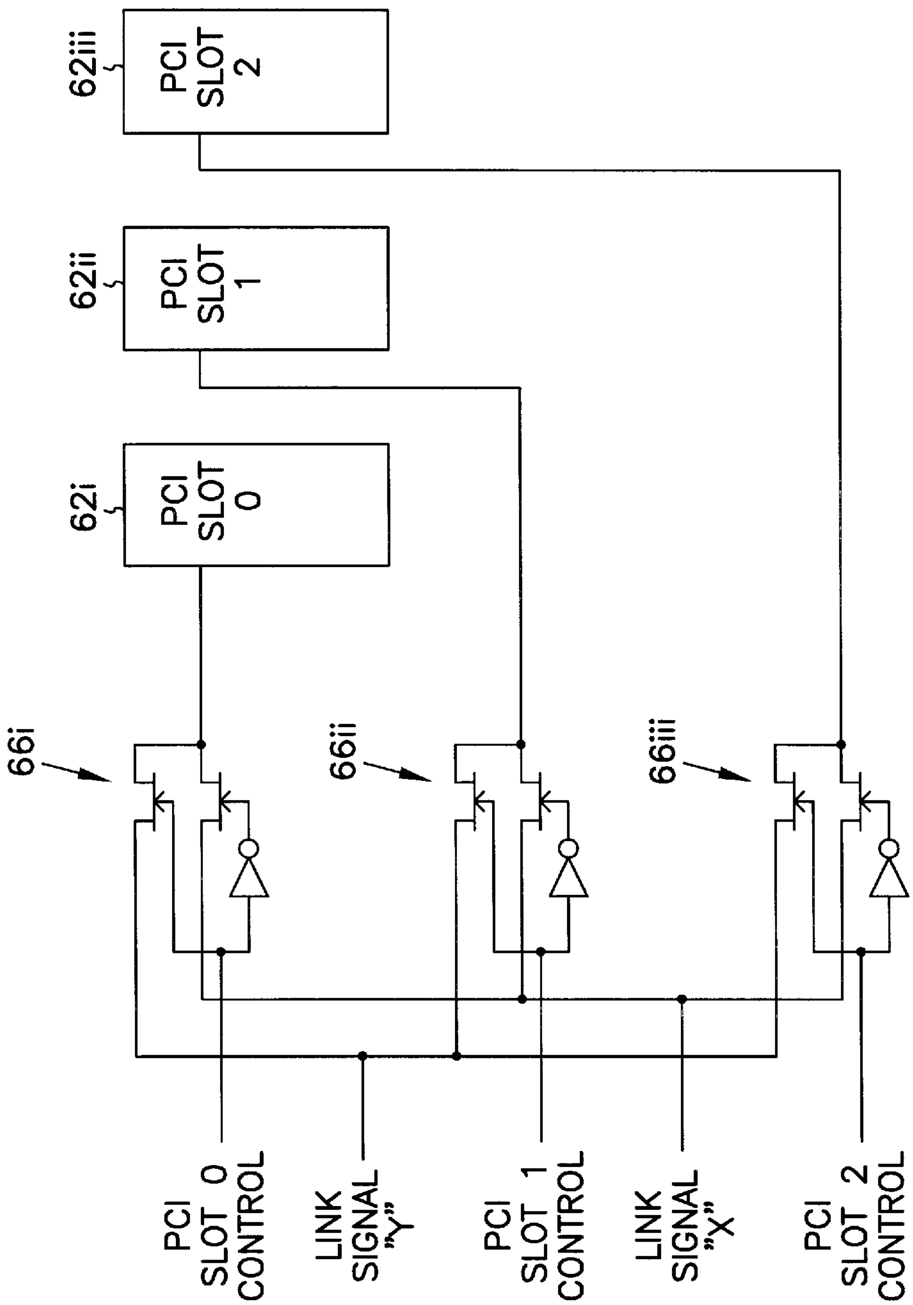
FIG. 3 illustrates an example embodiment of a multiplexor implementation according to the present invention.

Referring to FIG. 3, there is illustrated an embodiment of the invention providing more than one PCI slot 62. In this embodiment, slots 62-*i*, 62-*ii*, and 62-*iii*, or slots 0, 1 and 2, are each connected to corresponding multiplexor circuits 66-*i*, 66-*ii* and 66-*iii*, respectively, which are each configured to handle a single one of the N signals carried on lines 72. In this example embodiment, a single proxy link signal "y" is applied and a single PCI signal "x" is applied to the respective inputs of the multiplexor circuits. Multiple additional routing circuits would normally be required to implement a proxy link. It is noted that this architecture takes what is normally a non-multiplexed, bus topology and replaces it with a multiplexed, star topology.

Figure 4:
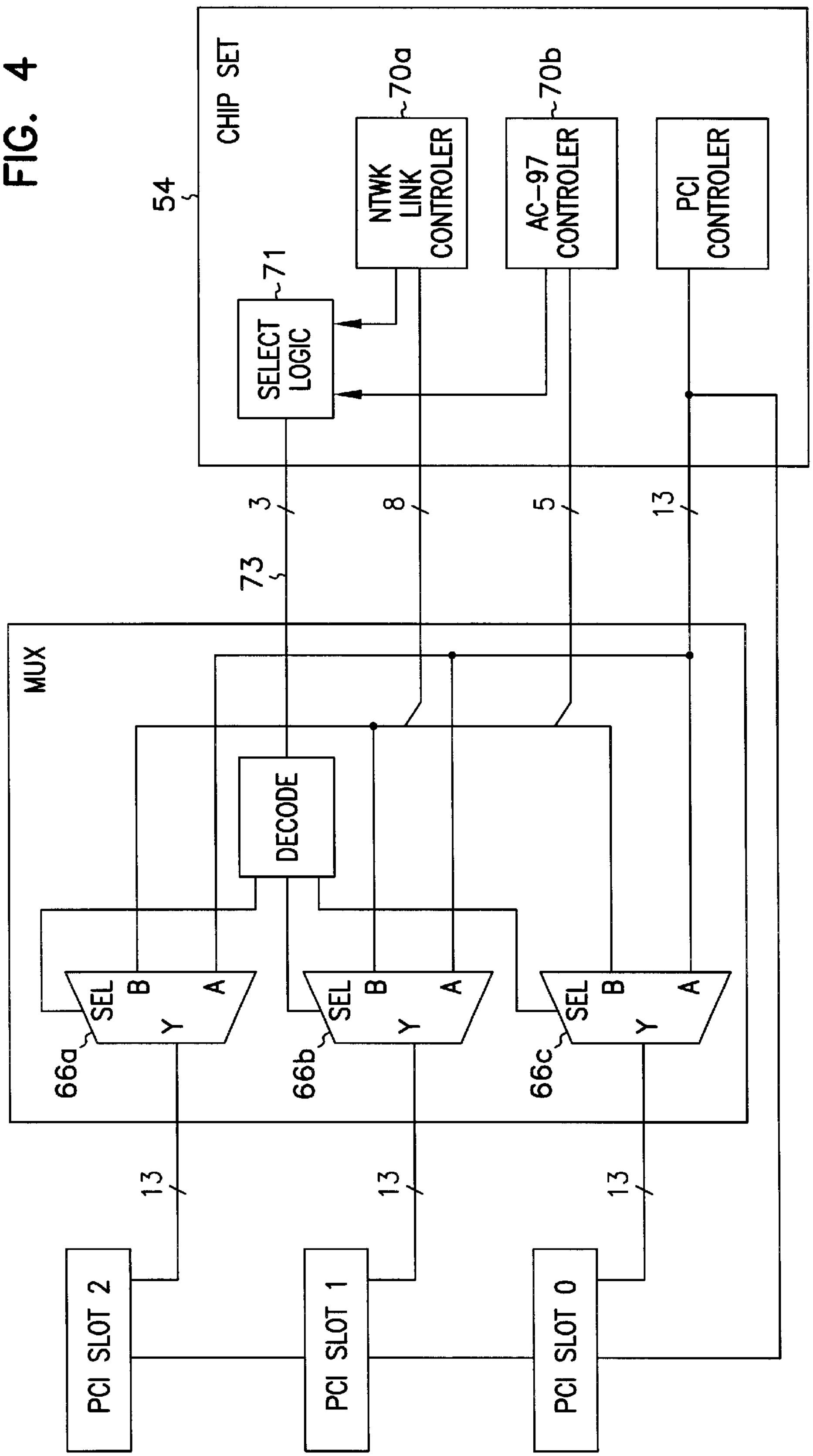
FIG. 4 illustrates another example embodiment of a multiplexor implementation according to the present invention.

Referring to FIG. 4, there is illustrated yet another embodiment of the invention with three PCI slots and two proxy controllers that can support up to two proxy cards 76. In this embodiment, the chip set 54 includes a first proxy link controller 70-*a*, taking the form of an AC-97 controller, and a second proxy link controller 70-*b*, taking the form of a network link controller. Controller 70-*a* provides 5 output signals and controller 70-*b* 8 output signals, of the total of 13 signals applied to the "B" input of each multiplexor 66-*a*, 66-*b* and 66-*c*, which in turn may select between these signals and the 13 signals of the PCI bus applied to the "A" inputs of each multiplexor. The balance of the PCI signals (the total less 13) are applied to the corresponding contacts of each slot 62-*a*, 62-*b* and 62-*c*, and the remaining 13 signals obtained from the outputs of the multiplexor. Select logic 71 receives select signals from each controller 70-*a* and 70-*b*, and provides three select lines 73 which are applied to the select inputs of the multiplexor to determine which input is applied to each output. Using this architecture, any one of controllers 70-*a* or 70-*b* or PCI controller 56 may be connected to any one of the PCI slots.

Referring to Table I below, there is illustrated an example implementation in more detail of an architecture such as that of FIG. 4 with two proxy links (Proxy Link X and Proxy Link Y). The proxy links shown consist of a total of 10 signals, but could consist of more than 10 signals. As illustrated in FIG. 4 and in Table I, the Proxy Links do not need to contain the same number of signals. PCI bus A/D lines A/D [11::2] are used to carry the Link signals in the example. Signals AD2–AD7 support a Network PHY function, and signals AD8–AD11 support a Broadband CODEC function.

TABLE I

| Link Signal | PCI Signal | Function Supported |
|---|---|---|
| Data In [0] Link X | AD2 | Network PHY |
| Dataln [1] Link X | AD3 | |
| Data Out [0] Link X | AD4 | |
| Data Out [1] Link X | AD5 | |
| Clock In Link X | AD6 | |
| RST/SYNC Out Link X | AD7 | |
| Data In Link Y | AD8 | Broadband CODEC |
| Data Out Link Y | AD9 | |
| Clock In Link Y | AD10 | |
| RST/SYNC Link Y | AD11 | |

Referring now to Table II, there is illustrated another example usage model of the system according to the present invention. According to one example embodiment of the invention, it is preferred if the proxy modules are designed so that there is no adverse system operation if a proxy module is placed in a standard PCI slot. The table below specifies an example system usage model.

TABLE II

| Main Board Slot Type | Add-in Module Type | System Response |
|---|---|---|
| Standard PCI Slot | Standard PCI | Normal PCI operation |
| Standard PCI Slot | Proxy | Proxy module outputs are tri-stated |
| PCI Proxy Slot | Standard PCI | Normal PCI operation |
| PCI Proxy Slot | Proxy | Proxy Link Operation |

As illustrated in Table II, this example usage model provides two standard PCI slots which cannot support a proxy module. If a proxy module is inserted in a standard PCI slot, the invention provides that the proxy module outputs are tri-stated to preclude damage to the system. The PCI proxy slots support either a standard PCI module or a proxy module.

Figure 5:
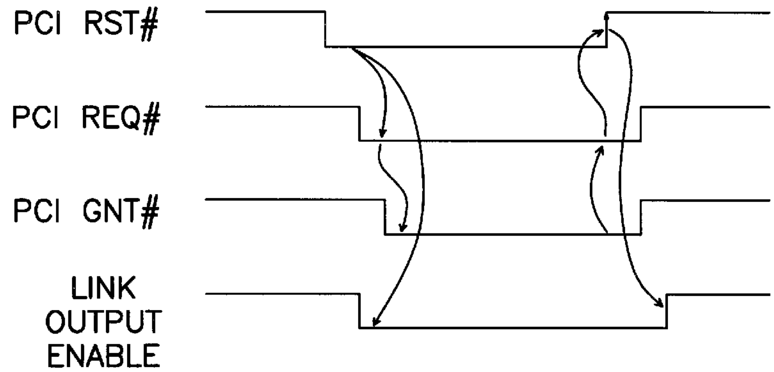
FIGS. 5 and 6 illustrate example method and apparatus for detecting a proxy link module in a PCI slot according the present invention.
Figure 6:
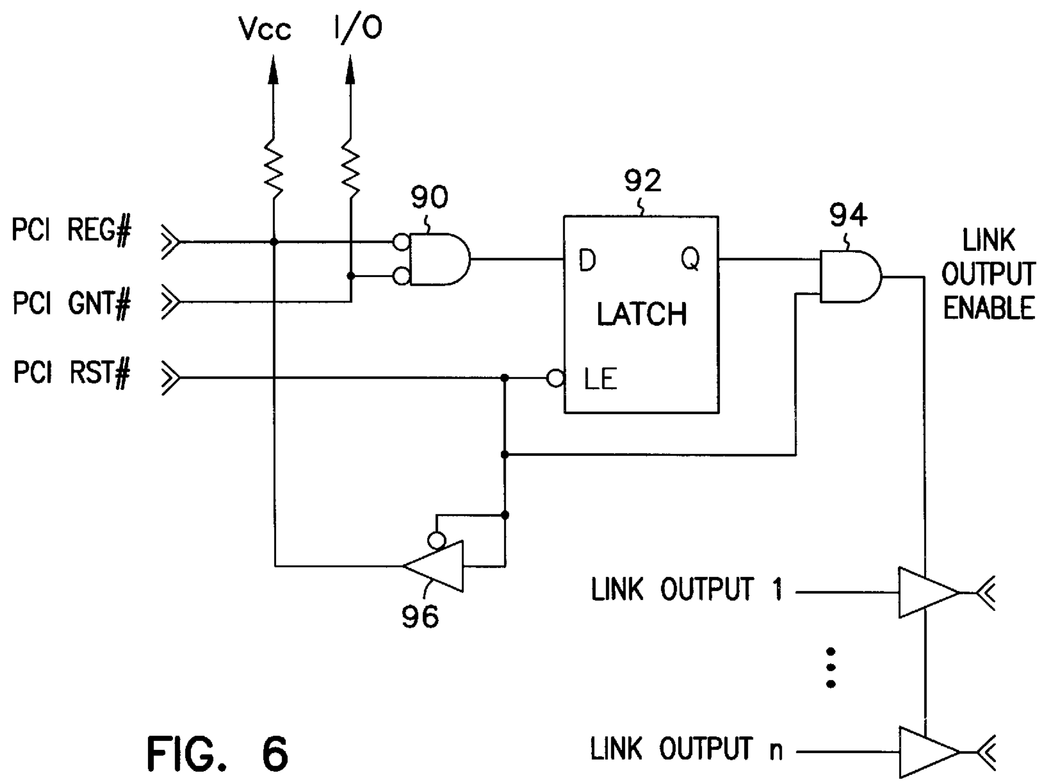

There are several methods of PCI card discovery available to implement this fail-safe operation. In one embodiment, the main board chip set tries to detect proxy link modules during PCI RESET assertion on pre-determined interface pins. If a link module is not detected, full PCI configuration would be restored to the PCI slot before the end of the PCI RESET assertion. As illustrated in the example embodiment of FIGS. 5 and 6, the proposed detection method is to use the PCI REQ# and PCI GNT# signals for the detection. As illustrated in FIG. 6, these signals are applied to gate 90. A proxy module asserts PCI REQ# during PCI RST# assertion, through buffer 96, which includes a tri-state output. The PCI RST# signal is applied to the latch enable input LE of latch 92. A standard PCI card must hold this signal in a Hi-Z state during PCI RST# assertion. A main board with proxy link logic asserts PCI GNT# during PCI RST# assertion in response to the PCI REQ# assertion. The main board does not assert PCI GNT# if PCI REQ# is not being asserted. If the PCI REQ# and PCI "GNT# signals are both asserted, gate 90 asserts an input to the D input of latch 92, which in turn asserts an output on its Q terminal, provided it is enabled during the PCI RST# signal assertion. A link output enable signal is in turn asserted through gate 94. PCI GNT# is terminated with a weak pull-up resistor to the appropriate voltage rail on the proxy module, so that no damage is done if a proxy module is plugged into a non-proxy link main board PCI slot. If a proxy module detects it is not in a proxy link main board, it maintains a tri-state condition on all of its outputs following PCI RST#. For this purpose, the Link Output Enable signal is connected to the link controller on the proxy module and is used to keep link outputs tri-stated in the case that the proxy module is installed in a PCI slot without link support.

Thus, as illustrated above, PCI signals that are normally bussed to each PCI slot are replaced by a star topology. In one example embodiment, the length of each lobe of the star topology are shorter than the bus length replaced, such that the multiplexor(s) on the main board should be placed as close as possible to the PCI signals being used for the proxy link. PCI signals will experience additional flight time delay due to the introduction of a switch element in the signal propagation path. However, PCI signals will experience less delay due to the decreased capacitive loading of a star topology versus a bus topology. Accordingly, a system that meets PCI timing requirements while providing an adequate number of slots is realizable using standard PCB design methods. Further, the proxy link riser should follow the PCI rules for operating and signaling voltages.

Thus, as illustrated above, the system 50 provides that a proxy card 22 as illustrated in FIG. 1, or a proxy card 76, as illustrated in FIG. 2, may be used. This system has the advantage of allowing the computer system 50 to be customized with PCI add-in cards of the lowest possible bill-of-material cost. The partitioning allows the analog and digital design cycles for an I/O function to be different. This de-coupling of the design cycle allows the analog portion of an I/O card design to remain unchanged while the digital control function migrates from the add-in card to the main board chip set. In a majority of cases it is believed that there is a much bigger cost benefit to moving digital functionality into the main board chip set which can use the latest process technology. Analog designs cannot always take advantage of the reduced die size that results from moving to a smaller geometry process. Because of the point-to-point nature of the proxy link, the link controller on the proxy card can be designed to have minimum complexity. This allows single chip implementations for proxy card I/O functions. In addition, this architecture allows that the main board multiplexor can be used to isolate the voltage requirements of the chip set from those of the I/O function. Further, the design allows re-use of the PCI bus mechanical and electrical design by a proxy link card, saving computer hardware vendors re-design and re-tooling costs.

What is claims is:

1. A method comprising:

using card slots of a computer system to support a first card with a card controller circuit mounted thereon; and using the card slots of the computer system also to support a second card without a card controller circuit mounted thereon with a card controller circuit mounted on a board of the computer system which is external to the first and the second cards.

2. An apparatus comprising:

a board having a card slot mounted thereon;

a proxy link controller mounted on the board; a proxy link card detector mounted on the board;

a multiplexor connected to the card slot, the multiplexor having electrical inputs selectively connectable to outputs connected to the card slot, wherein the multiplexor state is set based on a signal from the proxy link card detector; and proxy link signal lines connecting the proxy link controller to the card slot.

3. The apparatus according to claim 2, further including a processor.

4. An apparatus comprising:

a main board;

one or more card slots mounted on the board, each card slot adapted to receive a card;

each card slot including a plurality of electrical contacts;

a multiplexor for each card slot, each multiplexor having at least first and second sets of electrical inputs selectively connectable to a set of outputs connected to a first set of the electrical contacts on its respective card slot;

a link controller for each card slot, each link controller mounted on the main board;

a first plurality of electrical lines for each card slot, connecting the respective link controller to the first set of electrical inputs on the respective multiplexor;

a card controller mounted on the main board;

a second plurality of electrical lines connecting the card controller to the second set of electrical inputs on the multiplexor; and a third plurality of electrical lines connecting the card controller to each of a second set of electrical contacts on each card slot, wherein the contacts of the second set are different from the first set.

5. The apparatus according to claim 4 further including a card having a connector portion adapted to be inserted in the card slot, and wherein the connector portion has a plurality of electrical contacts which make an electrical connection with corresponding contacts on the card slot.

6. The apparatus according to claim 5 wherein the card is a card including a circuit which is connected to the contacts of the card which correspond to the contacts of the card slot which are connected to the multiplexor outputs, and further wherein the card does not include any circuit which is connectable to the second set of electrical contacts on the card slot when the card is inserted in the card slot.

7. The apparatus according to claim 6 wherein the circuit on the card includes a link interface which communicates with the link controller when the card is inserted in the card slot.

8. The apparatus according to claim 7 wherein the circuit on the card is adapted to communicate through an I/O connection to a device external to the apparatus.

9. The apparatus according to claim 5 wherein the card is a card includes a circuit which is connected to the contacts of the card which correspond to the contacts of the card slot which are connected to the multiplexor outputs, and further wherein the card includes one or more circuits which are connectable to the second set of electrical contacts on the card slot when the card is inserted in the card slot.

10. The apparatus according to claim 4 wherein each multiplexor is independently controlled, and is operative in one mode to connect the card controller to the card, and in another mode to connect the link controller to the card.

11. The apparatus according to claim 4 further including a circuit on the main board to detect signals generated by the card to determine what type of card it is.

12. The apparatus according to claim 4 wherein the link controller is an AC-97 controller.

13. The apparatus according to claim 4 wherein the link controller is a NTWK link controller.

14. The apparatus according to claim 4 further including a plurality of link controllers.

15. A method, comprising:

applying a set of signals from a card controller to a corresponding set of lines of a card bus;

connecting a subset of the lines of the card bus directly to a corresponding subset of the contacts on a card slot;

connecting another subset of the lines of the card bus to one input of a multiplexor;

connecting another set of lines to another input of the multiplexor;

connecting the output of the multiplexor to another subset of the contacts on the card slot; and the signals on the another set of lines originating from a link controller mounted on a main board of a computer system and adapted to communicate with a link interface.

16. A method according to claim 15 further including inserting a card into a card slot, the card having a connector portion adapted to be inserted in the card slot, and wherein the connector portion has a plurality of electrical contacts which make an electrical connection with corresponding contacts on the card slot.

17. A method according to claim 16 wherein the card is a card including a circuit which is connected to the contacts of the card which correspond to the contacts of the card slot which are connected to the multiplexor outputs, and further wherein the card does not include any circuit which is connectable to the second set of electrical contacts on the card slot when the card is inserted in the card slot.

18. A method according to claim 16 wherein the card is a card including a circuit which is connected to the contacts of the card which correspond to the contacts of the card slot which are connected to the multiplexor outputs, and further wherein the card includes one or more circuits which are connectable to the second set of electrical contacts on the card slot when the card is inserted in the card slot.

19. A method according to claim 18 wherein the circuit on the card includes a link interface which communicates with the link controller when the card is inserted in the card slot.

20. A method according to claim 19 wherein the circuit on the card is adapted to communicate through an I/O connection to an external device.

21. A method according to claim 15 further including one or more additional multiplexor and further including controlling each multiplexor independently, and wherein each multiplexor is operative in one mode to connect the card controller to a card, and in another mode to connect the link controller to a card.

22. A method according to claim 15 further including detecting signals generated by a card to determine the type of card, wherein the detecting is performed by a circuit on the main board.

23. A method according to claim 15 wherein the link controller is an AC-97 controller.

24. A method according to claim 15 wherein the link controller is a NTWK link controller.

25. A method according to claim 15 further including a plurality of link controllers.

* * * * *

UNITED STATES PATENT AND TRADEMARK OFFICE

CERTIFICATE OF CORRECTION

PATENT NO. : 6,678,776 B2
DATED : January 13, 2004
INVENTOR(S) : McTague

It is certified that error appears in the above-identified patent and that said Letters Patent is hereby corrected as shown below:

Title page,
Item [57], ABSTRACT,
Line 3, delete “PHI” and insert -- PCI --, therefor.
Line 14, delete “PHI” and insert -- PCI --, therefor.

Column 6,
Line 23, delete “includes” and insert -- including --, therefor.

Column 7,
Line 17, delete “multiplexor” and insert -- multiplexors --, therefor.

Signed and Sealed this

Fifteenth Day of June, 2004

JON W. DUDAS
*Acting Director of the United States Patent and Trademark Office*